US012739637B2

(12) United States Patent
Luo et al.

(10) Patent No.: US 12,739,637 B2
(45) Date of Patent: Sep. 15, 2026

(54) WIRELESS DISTANCE MEASURING METHODS, DEVICES AND SYSTEMS WITH VALIDATED MEASUREMENT COMMUNICATIONS

(71) Applicant: Cypress Semiconductor Corporation, San Jose, CA (US)

(72) Inventors: Hui Luo, Marlboro, NJ (US); Rakesh Taori, McKinnery, TX (US); Roman Baker, Las Vegas, NV (US)

(73) Assignee: Cypress Semiconductor Corporation, San Jose, CA (US)

( * ) Notice: Subject to any disclaimer, the term of this patent is extended or adjusted under 35 U.S.C. 154(b) by 643 days.

(21) Appl. No.: 18/301,865

(22) Filed: Apr. 17, 2023

(65) Prior Publication Data

US 2024/0349055 A1 Oct. 17, 2024

(51) Int. Cl.
*H04W 12/104* (2021.01)
*H04W 12/041* (2021.01)
*H04W 24/10* (2009.01)

(52) U.S. Cl.
CPC ....... *H04W 12/104* (2021.01); *H04W 12/041* (2021.01); *H04W 24/10* (2013.01)

(58) Field of Classification Search
CPC .. H04W 12/106; H04W 12/041; H04W 24/10
See application file for complete search history.

(56) References Cited

U.S. PATENT DOCUMENTS

| | | | | |
|---|---|---|---|---|
| 2017/0013412 | A1* | 1/2017 | Steiner | H04W 64/00 |
| 2019/0182674 | A1* | 6/2019 | Li | H04W 12/122 |
| 2020/0100108 | A1* | 3/2020 | Everson | H04W 12/041 |
| 2025/0168808 | A1* | 5/2025 | Ramachandran | H04W 24/10 |
| 2025/0275002 | A1* | 8/2025 | Chitrakar | H04W 24/10 |

* cited by examiner

*Primary Examiner* — Margaret G Webb

(57) ABSTRACT

A method can include transmitting a request with a request integrity code (IC), receiving a first message at a time t2, executing a validation operation on the first measurement message that includes an operation on at least a portion of the first measurement message with a key. In response to the first measurement message being determined invalid, indicating time t2 as invalid. A second measurement message can be transmitted at a time t3. A third measurement message can be received that includes two remote time values t1 and t4. In response to times t1 to t4 being determined to be valid, a first distance value can be calculated with the times t1 to t4. First and second messages can include ICs generated by executing the operation on the corresponding messages with the key. Corresponding devices and systems are also disclosed.

19 Claims, 14 Drawing Sheets

(BACKGROUND)

WIRELESS DISTANCE MEASURING METHODS, DEVICES AND SYSTEMS WITH VALIDATED MEASUREMENT COMMUNICATIONS

TECHNICAL FIELD

The present disclosure relates generally to wireless systems, and more particular to methods by which a wireless device can determine the distance to another wireless device.

BACKGROUND

Wireless communications according to the IEEE 802.11mc task group allow for Wi-Fi Round Trip Time (RTT) operations. Wi-Fi RTT operations can enable a wireless device to determine the distance to an access point device by measuring a round-trip signal delay using Fine Timing Measurement (FTM). FIG. 14 is a diagram showing a conventional system 1401 and corresponding Wi-Fi RTT operations. System 1401 can include an initiating station (STA) 1403 and responding STA 1405. An initiating STA 1403 can transmit a FTM request 1407, and a responding STA 1405 can return an acknowledgement (ACK) 1409. A series of FTM measurement operations can then occur over a burst duration 1411.

Conventional FTM measurements can start with a responding STA 1405 transmitting an initial FTM transmission 1413-1, which is acknowledged 1415 by the initiating STA 1403. A responding STA 1405 can continue to transmit FTM messages 1413-2/3 and receive ACKS 1415 over the burst duration 1411. Upon receiving an FTM measurement 1413-2/3, that includes a time of departure (t1_1) and time of arrival (t4_1), an initiating STA 1403 can calculate a distance 1417 using corresponding turnaround time values (t2_1, t3_1).

A drawback to IEEE 802.11mc Wi-Fi RTT methods can be security vulnerabilities in measurement operations. For example, a rogue STA could trick an FTM initiating STA into deriving a wrong distance measurement by impersonating a responding STA. An environment can include a legitimate responding STA that is out of range of the initiating STA. When the initiating STA issues an FTM request, the rogue STA can send FTM measurement frames to the initiating STA, thus making the initiating STA believe the legitimate responding STA is still in range. This can include the rogue STA sending an acknowledgement (ACK) as soon as it receives an FTM measurement frame, thus tricking the responding STA into recording a shorter response time (e.g., t4) that will be sent to the initiating STA in the next FTM measurement frame.

The IEEE 802.11az draft standard (in current form) can protect FTM request frames and Location Measurement Report (LMR) frames by Protected Management Frames (PMFs). This is achieved by letting a transmitting STA generate a Message Integrity Code (MIC) for each management frame (FTM request frames and LMR frames are management frames) using a secret key shared with a receiving STA, so that the receiving STA can independently generate a verification MIC that should be identical to the MIC in the received management frame if the frame is not altered during the transmission. The IEEE 802.11az standard can also, optionally, protect ranging Null Data Packet (NDP) frames at the physical layer in IEEE 802.11ax (High-Efficiency Long Training Field) HE-LTF symbols using another secret key shared between the transmitting STA and the receiving STA. However, IEEE 802.11az measurement operations can only be used with IEEE 802.11ax and future Wi-Fi technologies, and there is no current timeline to migrate to IEEE 802.11ax. Thus, such features are not available for measurement IEEE 802.11mc measurement operations, which can be used for all OFDM Wi-Fi technologies.

It would be desirable to arrive at some way of improving security in wireless measurement operations, such as those compatible with the IEEE 802.11mc standard.

SUMMARY

Embodiments can include wireless devices that can generate integrity codes for wireless distance measurement messages by executing an arithmetic-logic operation (e.g., cryptographic hash function) on the message data with a shared key. An integrity code can be included in a predetermined field of the measurement message. Measurement messages can include time values to enable distance measurement, such as those based on round trip time. A device receiving such a measurement message can authenticate the message using the same shared key. A measurement message failing authentication can have its receive time invalidated. In some embodiments, measurement messages with integrity codes can be transmitted bidirectionally between an initiating and responding device. Both such devices can calculate a distance value from time measurement values included in exchanged measurement messages.

DETAILED DESCRIPTION

According to embodiments, wireless distance measurement transmissions can include integrity codes generated with a mutual encoding key known by both an initiating and responding device. Integrity codes can be generated by executing an arithmetic-logic operation on all, or a portion, of the corresponding message. Upon receiving a measurement message, an initiating device and/or responding device can execute the same arithmetic-logic operation on the received message (or portion thereof). Such an operation can use the same mutual encoding key to generate a local integrity code. If the generated integrity code matches that received with the message, the message can be deemed authenticated.

In some embodiments, as a responding device transmits measurement messages with integrity codes, the corresponding initiating device can transmit measurement messages with integrity codes. The responding and initiating devices can both authenticate measurement messages, and both calculate a range value. In some embodiments, range values can be exchanged between initiating and responding devices.

In some embodiments, measurement messages are compatible with one or more IEEE wireless standards.

In some embodiments, an integrity code can be message integrity code (MIC) generated according to a predetermined standard.

In some embodiments, a mutual key used for generating integrity codes can be derived through a pre-association or association process between the initiating and responding devices. However, in other embodiments a mutual key can be generated through other service protocols, such as a matter commissioning protocol or a device provisioning protocol (DPP), as but two of many possible examples.

Figure 1:
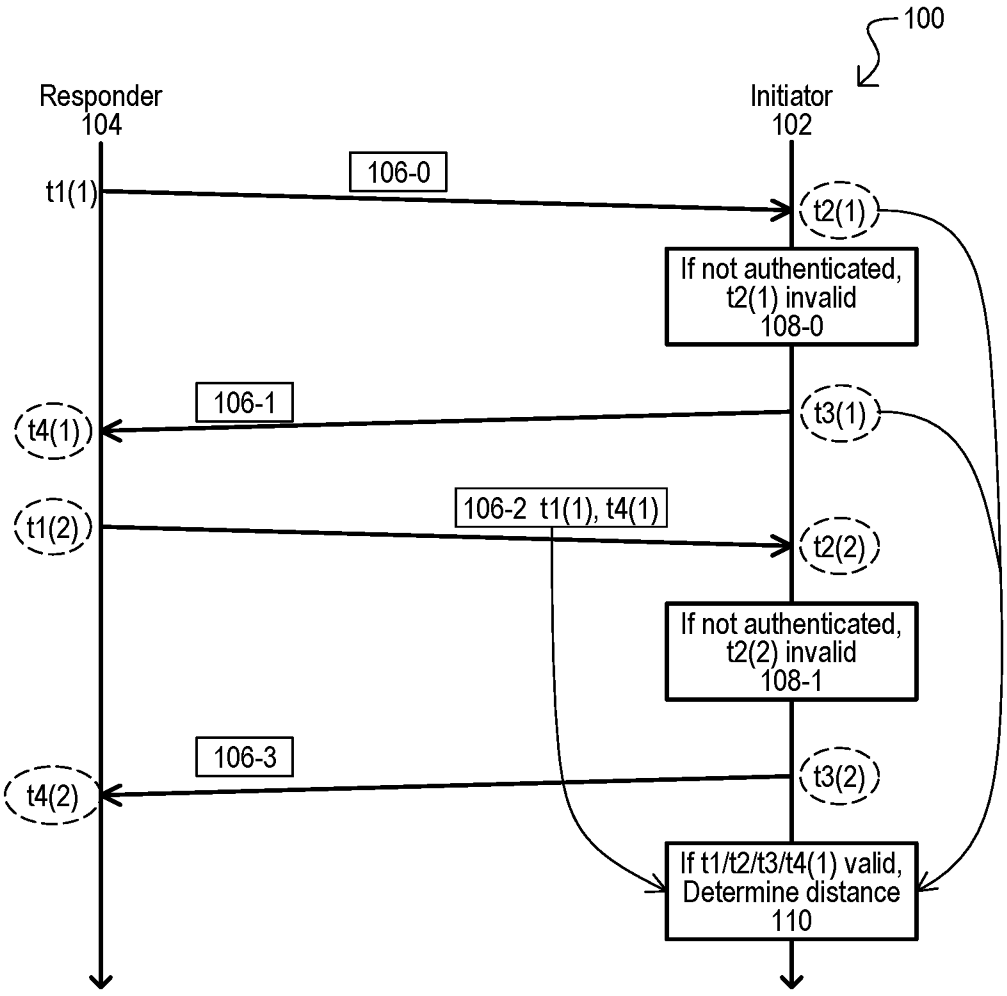
FIG. 1 is a diagram showing a system executing wireless distance measurement operations with authentication according to an embodiment.

FIG. 1 is a diagram showing a system and operations for executing wireless ranging according to an embodiment. A system 100 can include an initiator 102 and a responder 104. An initiator 102 and responder 104 can be wireless devices that can communicate according to one or more wireless standards. FIG. 1 shows wireless messages transmitted and received between such devices, as well as times at which such transmissions/receptions occur. FIG. 1 also shows operations executed by the initiator 104 and responder 106. The operations shown in FIG. 1 assume that previous operations (not shown) have enabled initiator 104 and responder 106 to generate a mutual key. Further, it is assumed that a responder 102 has been requested by an initiator 102 to begin ranging operations.

Referring still to FIG. 1, at time t1(1) a responder 104 can transmit a measurement message 106-0 that can include an integrity code. An integrity code can be generated using the mutual key known to both initiator 102 and responder 104. Thus, a device (i.e., initiator or responder 102/104) receiving an integrity code in a message can generate its own integrity code for comparison to the received integrity code. In some embodiments, an integrity code can be generated with an arithmetic-logic operation executed on all, or a portion, of a message using the mutual key. In some embodiments, such an arithmetic-logic operation can include a cryptographic hash function that uses the mutual key.

A time t1(1) can be considered a time of departure (TOD) measurement for initiator 102. Message 106-0 can be received at initiator 102 at time t2(1). A time t2(1) can be considered the start of a turnaround time for the initiator 102. Initiator 102 can execute an authentication operation 108-0 on the received message 106-0. Such an operation can include determining if its own generated integrity code matches that of the message 106-0. If such authentication fails, the receive time value (t2(1)) can be considered invalid.

At time t3(1), an initiator 102 can transmit a measurement message 106-1 that includes a corresponding integrity code. A time t3(1) can be considered the end of a turnaround time for initiator 102. Message 106-1 can be received at responder 104 at time t4(1). A time t4(1) can be considered a time of arrival (TOA) for the initiator 102.

At time t1(2), a responder can transmit a message 106-2 that can include a an integrity code, as well as the values t1(1)/t4(1). This can complete a "round" of a ranging operation, as it results in initiator 102 having four values (t1(1), t2(1), t3(1), t4(1)) for calculating a distance to responder 104. Message 106-2 can be received at initiator 102 at time t2(2). Initiator 102 can execute an authentication operation 108-1 on the received message 106-2. If such authentication fails, time t2(2) can be determined to be invalid.

Upon having a complete set of measurement values (t1(1), t2(1), t3(1), t4(1)), initiator 102 can execute a distance measuring operation 110. Such an operation can first determine that the time values for the measurements are valid. If a time value is not valid, a distance measurement may not be taken. If the time values are determined to be valid, a distance measurement can be calculated.

In some embodiments, the transmission of message 106-2 can be the start of a next round of ranging. In such a case, initiator 102 can transmit a message 106-3 at time t3(2) to continue a ranging operation.

In this way, a ranging operation can include devices utilizing mutual encoding keys to generate integrity codes for inclusion in transmissions. Integrity codes can enable such devices to authenticate wireless measurement transmissions.

Figure 2:
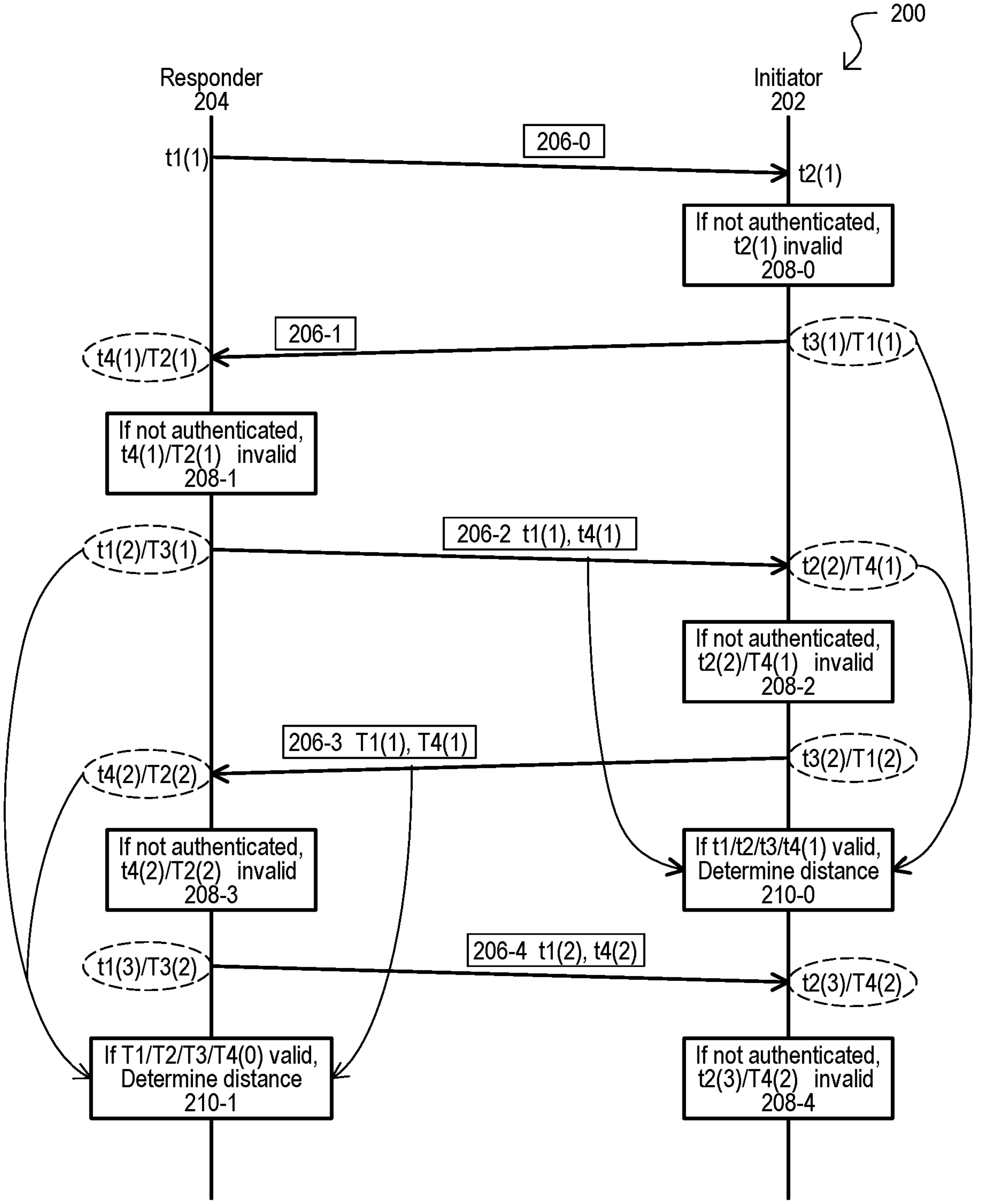
FIG. 2 is a diagram showing a system executing bi-directional wireless distance measurement operations with authentication according to an embodiment.

FIG. 2 is a diagram of a system 200 according to another embodiment. A system 200 can include an initiator 202 and responder 204 as in the case of FIG. 1, and such devices can execute authentication and measurement operations as described for FIG. 1. FIG. 2 differs from FIG. 1 in that the transmissions that provide time values that enable initiator 202 to execute a range calculation, can be used by responder 204 to execute its own range calculation. Further, responder 204 can execute its own authentication operations on measurement messages received from initiator 202.

Authentication operations 208-0/2 and distance measurement operation 210-0 can occur the same fashion described for FIG. 1 (108-0/1, 110). However, time measurements following an initial measurement message 206-0 can be used by both an initiator 202 and responder 204. Thus time t3(1), which can be the end of a turnaround time for initiator 202 can also be the TOD (T1(1)) for responder 204.

Similarly, t4(1) which can be the TOA for initiator, can be the start of a turnaround time (T2(1)) for responder 204.

Responder 204 can execute an authentication operation 208-1 on received message 206-1. Such authentication can occur as described in FIG. 1, with responder 204 generating an integrity code for comparison with one included in the message 206-1. If authentication fails, the receive time (t4(1)/T2(1)) can be determined to be invalid. Authentication operations can continue for each received message (e.g., 208-3).

Once values sufficient for a range calculation have been established (e.g., T1(1), T2(1), T3(1), T4(1)), a responder 204 can determine if such time values are valid. If time values are not all valid, a distance measurement may not be taken or considered invalid. If the time values are determined to be valid, a distance measurement can be calculated 210-1. In some embodiments, a responder 204 can transmit its distance measurement to an initiator 202 to enable the initiator to generate a range value from both distance measurements.

In this way, in a ranging operation, both an initiator and responder can authenticate received measurement messages with integrity codes using a mutual encoding key. In addition, both and initiator and responder can calculate their own range values (i.e., measurement operations can be bi-directional).

According to embodiments, an initiating device can be an initiating station (STA) that can execute fine time measurement (FTM) operations compatible with the IEEE 802.11mc or other standard (e.g., 11n, 11ac, 11ax). An initiating STA can transmit FTM request frames that include a Message Integrity Code (MIC) within a vendor-specific data field. In some embodiments, a MIC can be included in a Location Civic Measurement Request element of an FTM Request frame. In addition, a MIC can be included in FTM measurement frames, such as within a FTM Timing Measurement Parameters element. MICs can protect FTM request and measurement frames by ensuring such frames have not been altered or impersonated. MICs can be generated with a shared key.

A shared key used for generating MICs can be derived in any suitable manner. In some embodiments a shared key can be derived from a pairwise master key (PMK) via association or a pre-association security negotiation (PASN), including an extensible authentication protocol (EAP). However a shared key may also be derived in other contexts. As but two of many possible examples, a shared key can be derived from authentication when a FTM distance measurement is in the middle of some service protocols, such as a matter commissioning protocol or Device Provisioning Protocol (DPP). In such embodiments, association or PASN do not need to be included to establish the shared key for generating a MIC.

A MIC can be generated with any suitable method using the shared key. In some embodiments, a MIC can be a hash based message authentication code (HMAC) using any suitable cryptographic hash function, including but not limited to: MD-5, SHA-1 or SHA-256.

Figure 3A:
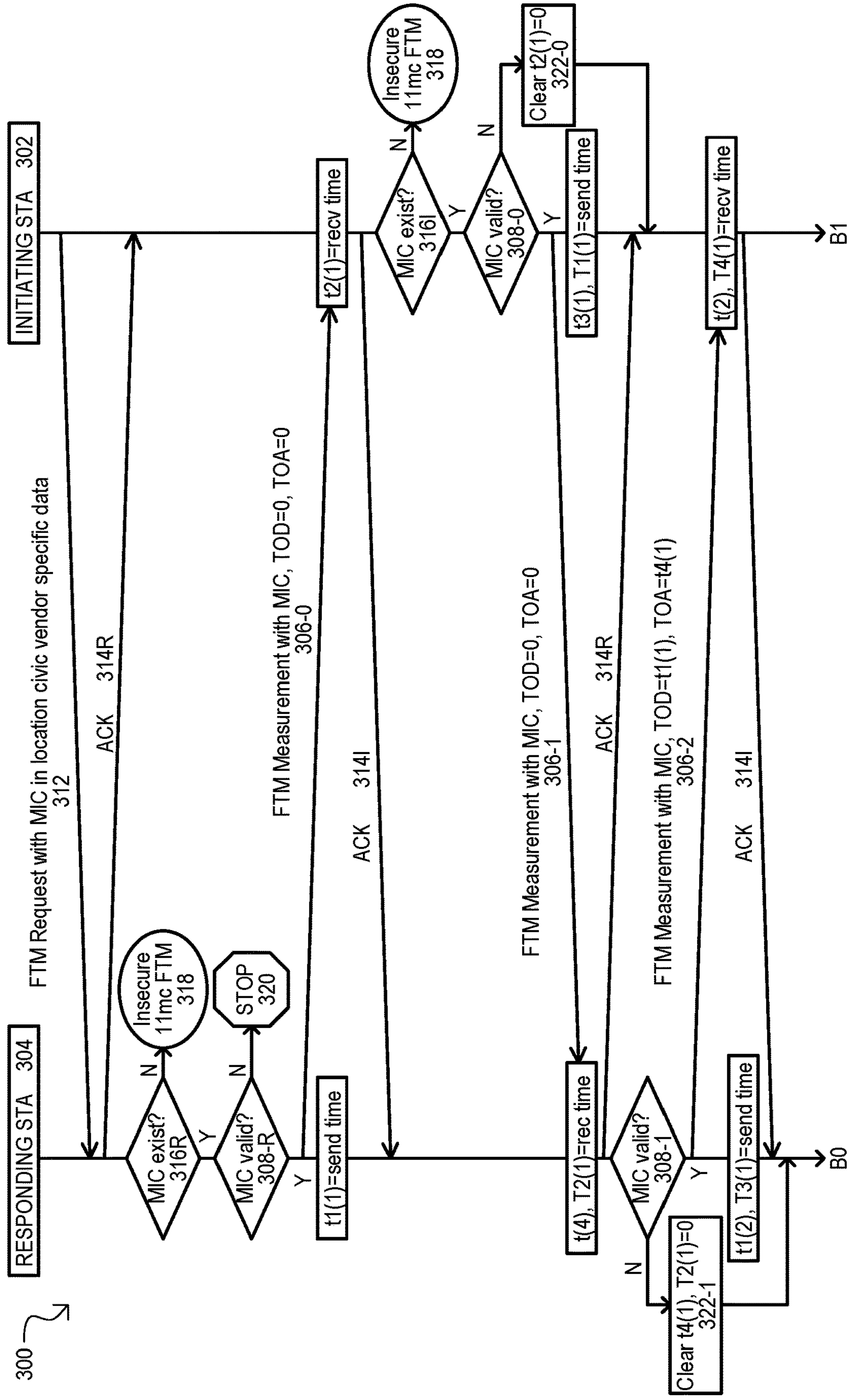
FIGS. 3A and 3B are diagrams showing a system executing fine time measurement (FTM) operations with authentication according to an embodiment.
Figure 3B:
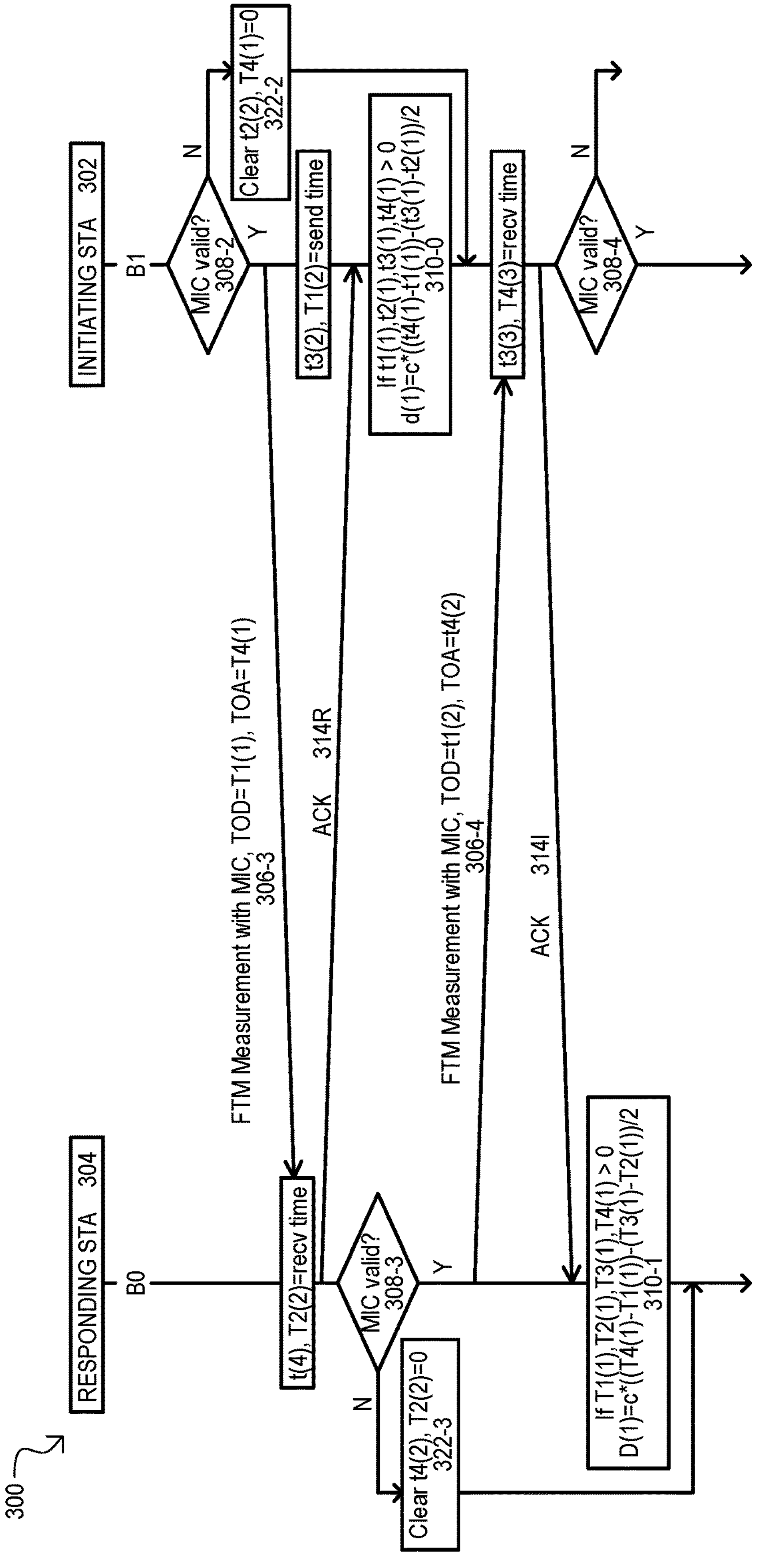

FIGS. 3A and 3B are signaling diagrams showing a system 300 and ranging operations according to an embodiment. A system 300 can include an initiating STA 302 and responding STA 304 which can conduct wireless communications compatible with one or more IEEE 802.11 wireless standards (proposed or finalized). In some embodiment, such a standard may not provide for the full encryption of FTM measurement frames (i.e., the standard cannot provide protected management frames). In some embodiments, communications of initiating and responding STAs (302/304) can be compatible with the IEEE 802.11mc standard.

Referring to FIGS. 3A and 3B, an initiating STA 302 can send a FTM request frame with a corresponding MIC 312. In the embodiment shown, the MIC can be included with vendor specific data, such as location civic data. In some embodiments, location civic data can include any data suitable for describing an area of operation, including but not limited to any of: latitude, longitude, address (e.g., country, state/province, city, street address) or other location information (e.g., landmarks, building information). A MIC can be generated according to any of the methods described herein, or equivalents, with a shared key derived as described for embodiments herein, or any equivalent methods.

FIGS. 3A and 3B show operations that can include FTM measurements by initiating STA 302 as well as responding STA 304. Time values for distance calculations executed by initiating STA 302 are designated by lower case "t", while time values for the "reverse" distance calculation executed by responding STA 304 are designated with a capital "T".

Upon receiving FTM request frame 312, a responding STA 304 can return an acknowledgement (ACK) 314R. A responding STA 304 can determine if a MIC exists 316R within the FTM request frame 312. Such an action can include examining particular fields in the FTM request frame 312. If a MIC is not present (e.g., the data is not understood to be a MIC) (N from 316R), a system 300 can follow an alternate operation. In the embodiment shown, a responding STA 304 can end the current FTM session, leaving an initiating STA 302 to determine if it will follow the (insecure) FTM protocol under IEEE 802.11mc 318.

If a MIC is present (Y from 316R), a responding device 304 can determine if the MIC is valid 308-R. Such an action can include generating a comparison MIC using its shared key and the message data. If the MIC is invalid (N from 308-R), a responding STA 304 can ignore the FTM Request frame 320. Otherwise (Y from 308-R), a responding STA 304 can follow an FTM protocol (e.g., IEEE 802.11mc) to negotiate measurement parameters or start FTM measurement operations using the parameters in FTM measurement request frame 312.

FTM measurement operations can include a responding STA 304 sending one or more bursts of FTM measurement frames to initiating STA 302 (shown as 306-0, 306-2 and 306-4). In some embodiments, each FTM measurement frame can include civic report vendor specific data containing a MIC for the entire frame. For each FTM measurement frame sent by responding STA 304, responding STA 304 can record the sending time as t1(n) (also denoted as T3(n) in the reverse FTM). The FTM Measurement frame carries t1(n−1) as a TOD and t4(n−1) as a TOA, where n−1 is the previous measurement round. If a previous measurement round does not exist, TOA and TOD can be set to invalid values.

In response to a first FTM measurement frame 306-0 received from a responding STA 304, an initiating STA 302 can return an ACK 314I and then determine if a MIC exists 316I. Such an action can include those described for responding STA 304, including proceeding to insecure FTM operations 318 if no MIC exists (N from 316).

For each FTM measurement frame (e.g., 306-0/2/4) sent by a responding STA 304, initiating STA 302 can return an ACK 314I and validate the frame using the MIC included in the frame. If the MIC is valid (Y from 308-2/4), initiating STA can record the receiving time as t2(n) (also denoted as T4(n−1) in the reverse FTM), and immediately sends back an FTM Measurement frame, and records the sending time as t3(n) (also denoted as T1(n) in the reverse FTM). This FTM Measurement frame can carry T1(n−1)=t3 (n−1) as TOD and T4 (n−1)=t2(n) as TOA. An initiating STA 302 can use time values from a previous round to compute the distance 310-0, which in the embodiment shown can be $d(n-1)=c*((t4(n-1)-t1(n-1))-(t3(n-1)-t2(n-1)))/2$, where c is the speed of light.

For each FTM measurement frame sent by an initiating STA (e.g., 306-1/3), a responding STA 304 can return an ACK 314R and validate the corresponding MIC (e.g., 308-

1/3). If the MIC is not valid (e.g., N from 308-1/3), a responding STA 304 can invalidate the receive time. If the MIC is valid (e.g., Y from 308-1/3), a responding STA 304 can record the receiving time as t4(n) (also denoted as T2(n) in reverse FTM). A responding STA 304 can also compute the distance using time measurements of a previous round, which in the embodiment shown can be D(n−1)=c*((T4(n−1)-T1(n−1))-(T3(n−1)-T2(n−1)))/2.

A responding STA 304 and initiating STA can send a next round of FTM measurement frames, until a FTM session ends. After an FTM session ends, both STAs (302/304) can average d(n) and D(n) for all n as a measured distance between them.

While FIGS. 3A and 3B show operations in which distance measurements can be calculated after each round, in alternate embodiments distance measurements can be calculated after multiple rounds.

FIGS. 3A and 3B show how an initiating STA, after receiving and acknowledging an FTM Measurement frame from a responding STA, can also send its own FTM Measurement frame to a responding STA. The responding STA can use the receive time of the initiating STA's FTM Measurement frame as t4. The initiating STA uses sending time of its own FTM Measurement frame as t3. This can prevent early ACK attacks.

In this way, a system can provide ranging with FTM measurements that include authentication codes. In some embodiments, such ranging can be provided for standards/protocols that do not include full frame encryption, such as IEEE 802.11mc.

Figure 4A:
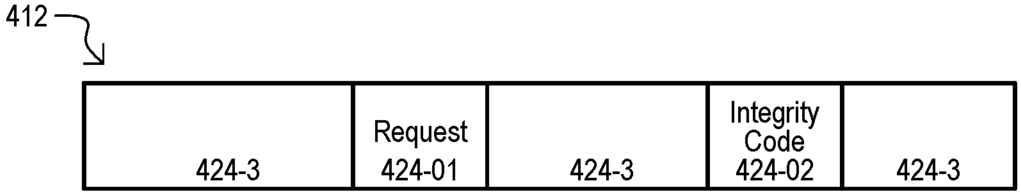
FIGS. 4A and 4B are diagrams showing secure wireless measurement messages according to embodiments.
Figure 4B:
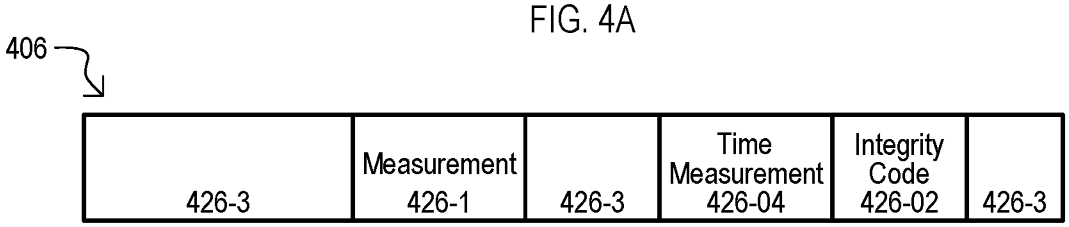

FIGS. 4A and 4B are diagrams of wireless messages according to embodiments. FIG. 4A shows a request message 412 according to an embodiment. A request message 412 can include various fields having bit values. Such fields can include a type field 424-01, an assignable field 424-02 and other fields 424-3. A type field 424-01 can identify the message 412 as a request to start measurement operations using time values (e.g., RTT measurements). An assignable field 424-02 can be a field to which data values can be assigned by an entity, including but not limited to a vendor or manufacturer of a wireless device. Assignable field 424-02 can include an integrity code generated from some or all of the other fields (424-01/424-3) according to any of the methods described herein or equivalents. Other fields 424-3 can include fields suitable for the given protocol/standard.

FIG. 4B shows a measurement message 406 according to an embodiment. A measurement message 406 can include various fields with bit values. Such fields can include a type field 426-1, a time measurement field 426-04 and an assignable field 426-02. A type field 426-1 can identify the message 406 as a time measurement message. A time measurement field 426-04 can include time measurement values that can be used to generate a distance value (e.g., TOA, TOD with respect to the other device). An assignable field 426-02 can be a field to which data values can be assigned by an entity, as described herein, and can include an integrity code generated from some or all of the other fields (426-01/426-3) according to any of the methods described herein or equivalents. Other fields 424-3 can include fields suitable for the given protocol/standard.

In this way, messages in a wireless distance measuring operations can include one or more fields in which an integrity code can be included for authenticating the message.

Figure 5A:
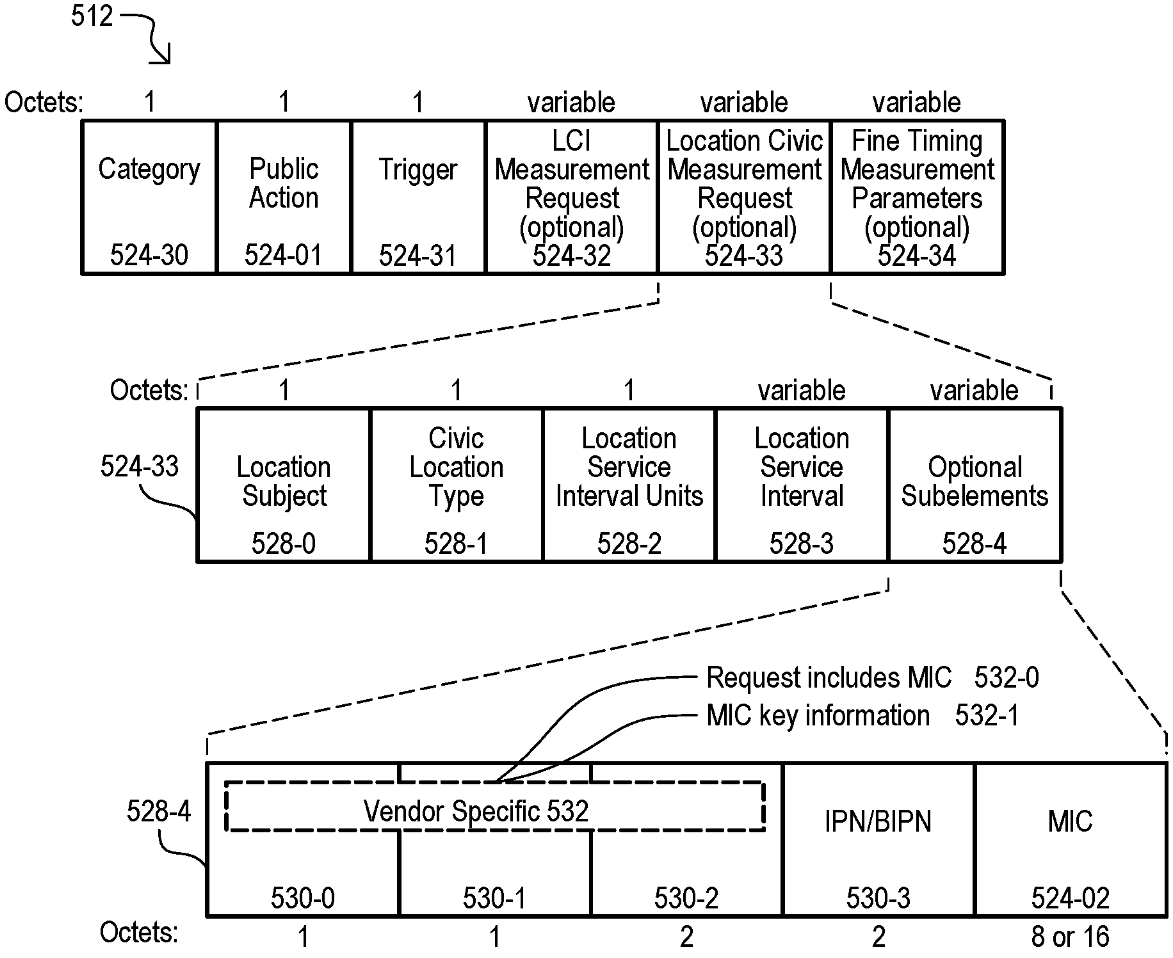
FIGS. 5A and 5B are diagrams showing a FTM request frame and FTM measurement frame according to embodiments.

FIG. 5A is diagram showing a FTM measurement request frame 512 that includes a MIC according to an embodiment. In some embodiments, request frame 512 can be compatible with FTM measurement operations according to one or more IEEE 802.11 standards, including but not limited to the IEEE 802.11mc standard. Request frame 512 can be transmitted by an initiating STA to commence a FTM measurement operation. In some embodiments, such a request can indicate bi-directional FTM measurement operations, as described herein or an equivalent. In the embodiment shown, request frame 512 can include a location civic measurement request field 524-33 that includes a MIC generated from the entire frame 512.

Referring still to FIG. 5A, a request frame 512 can include a category field 524-30, public action field 524-01, trigger field 524-31, local configuration information (LCI) measurement request field 524-32, location civic measurement request field 524-33 and, optionally, a fine timing measurement parameters field 524-34. As shown, fields 524-30, 524-01 and 524-31 can be one octet fields. The remaining fields can be of variable octet size.

A category field 524-30 can be set (e.g., to "4") to indicate a public action. A public action field 524-01 can be set (e.g., to "32") to indicate a FTM measurement request. A trigger field 524-31 can be set (e.g., to "1") to indicate the start of a FTM measurement operation. LCI measurement request and fine timing measurement parameters fields (524-32/524-34) can include values suitable for the environment and measurement operations being performed.

FIG. 5A also shows a location civic measurement field 524-33 that includes a MIC according to an embodiment. A location civic measurement field 524-33 can include the following elements: location subject 528-0, civic location type 528-1, location service interval units 528-2, location service interval 528-3 and optional subelements 528-4. A location subject element 528-0 can indicate a responding STA (e.g., set to 1). A civic location type element 528-1 can be a vendor specific value. Location service interval and units elements 528-2/3 can be set to zero. Optional subelements 528-4 can include a MIC generated from the entire frame 512. In the embodiment shown, fields 528-0 to 528-2 can be one octet, while the remaining fields 528-3/4 can be of variable octet size.

FIG. 5A further shows optional subelements 528-4 according to an embodiment. Optional subelements 528-4 can include vendor specific data 532, a packet number field 530-3 and MIC a field 524-02. In some embodiments, vendor specific data 532 can include values registered with a standards organization, including but not limited to an organization unique identifier (OUI) registered with the IEEE. In some embodiments, vendor specific data 532 can indicate that the request frame 512 is the type that includes a MIC 532-0, including identifying a location of the MIC (e.g., in location civic report for measurement frames). Vendor specific data 532 can also include MIC key information 532-1, which can indicate which key was used for generating a MIC. As but one of many possible examples, MIC key information 532-1 can indicate if a MIC corresponds to a protected management frame (PMF) or if it has been generated using a key derived from context, as described herein or equivalents.

Packet number field 530-03 can include a packet number value for counter operations, or in some embodiments, can also include vendor specific data 532. MIC field 524-02 can include a MIC generated from the entire request frame 512 according to methods and operations as described herein and equivalents.

In this way, a FTM request frame compatible with one or more IEEE 802.11 standards (e.g., 11mc, 11n, 11ac, 11ax)

can include a MIC for authentication in a frame field reserved for vendor specific data.

Figure 5B:
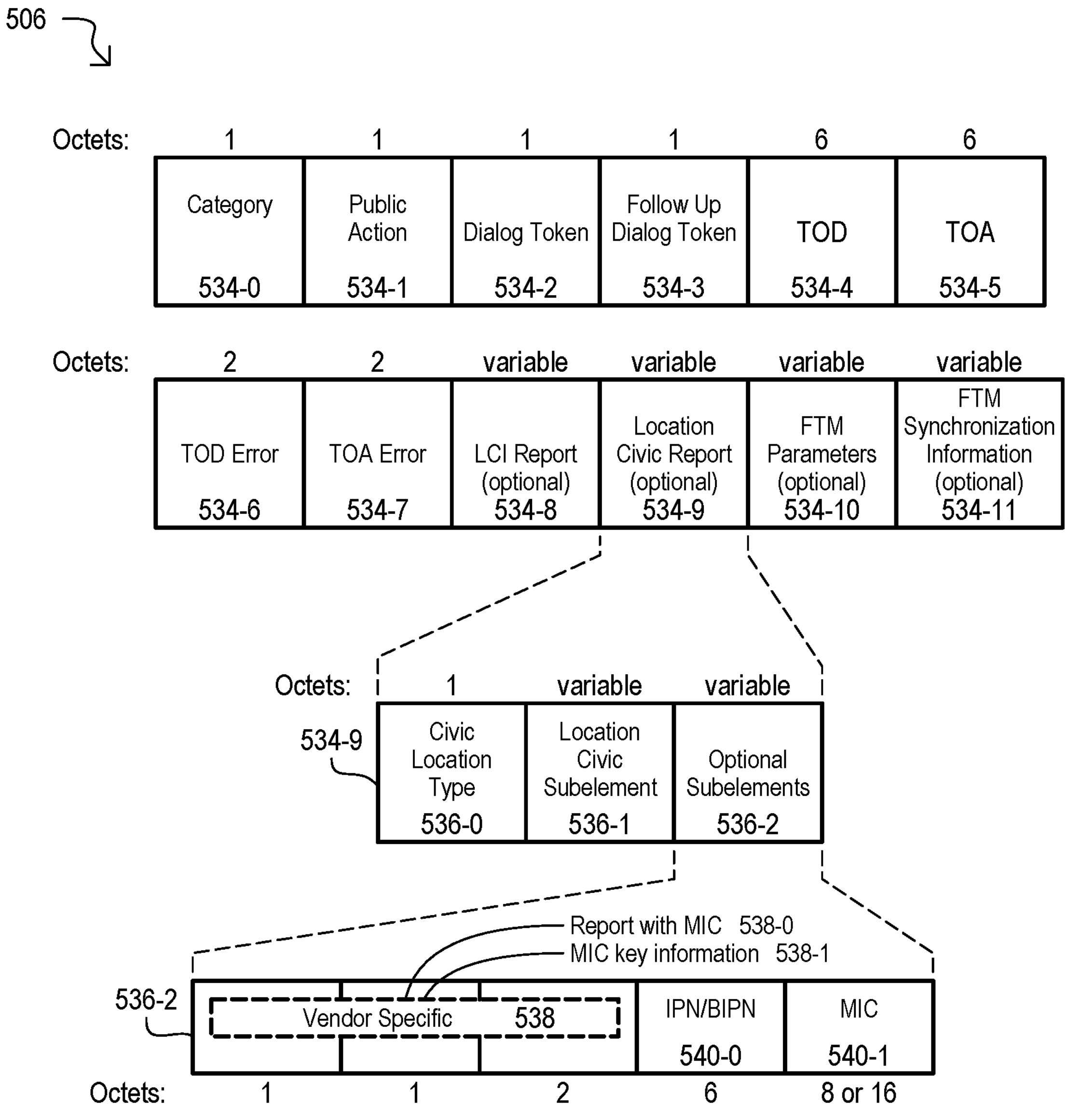

FIG. 5B is diagram showing a FTM measurement frame 506 that includes a MIC according to an embodiment. In some embodiments, FTM measurement frame 506 can be compatible with FTM measurement operations according to one or more IEEE 802.11 standards, including but not limited to the IEEE 802.11mc standard. Measurement frame 506 can be transmitted by a responding STA, and in bi-directional embodiments, both a responding STA and an initiating STA. In the embodiment shown, measurement frame 506 can include a location civic report field 534-9 that includes a MIC generated from the entire frame 506.

Referring still to FIG. 5B, a measurement frame 506 can include a category field 534-0, public action field 534-1, dialog token field 534-2, follow up dialog token field 534-3, TOD field 534-4, TOA field 534-5, TOD error field 534-6, TOA error field 534-7, LCI report field 534-8, location civic report field 534-9, FTM parameters field 534-10 and FTM synchronization information field 534-11. As shown, fields 534-0/1/2/3 can be one octet fields, TOD/TOA fields 534-4/5 can be six octet fields, TOD/TOA error fields 534-6/7 can be 2 octet fields. The remaining fields can be of variable octet size.

A category field 534-0 can be set to indicate a public action (e.g., 4). A public action field 534-1 can be set to indicate a FTM measurement (e.g., 33). A dialog token field 534-2 can be set to indicate a FTM measurement frame ID for a current session. A follow up dialog token field 534-3 can be set to indicate a previous FTM measurement frame ID. A TOD field 534-4 can include the time value for the sending time of a previous FTM measurement frame (e.g., t1). A TOA field 534-5 can include the time value for the receive time of a previous FTM measurement frame (e.g., t4). TOD/TOA error fields 534-6/7 can include error values for the TOA and TOD time values. FTM measurement parameter and synchronization information fields 534-10/11 can include values suitable for the measurement operations being performed. A location civic report field 534-9 can include a MIC for the entire measurement frame 536.

FIG. 5B also shows a location civic report field 534-9 that includes a MIC according to an embodiment. A location civic report field 534-9 can include the following elements: civic location type 536-0, location civic subelement 536-1 and optional subelements 536-2. Optional subelements 536-2 can include a MIC generated from the entire frame 506. In the embodiment shown, field 536-0 can be one octet, while the remaining fields 536-1/2 can be of variable octet size.

FIG. 5B further shows optional subelements 536-2 according to an embodiment. Optional subelements 536-2 can include vendor specific data 538, a packet number field 540-0 and a MIC field 540-1. In some embodiments, vendor specific data 538 can include values registered with a standards organization, including but not limited to an OUI registered with the IEEE. In some embodiments, vendor specific data 538 can indicate that the measurement frame 506 is the type that includes a MIC 538-0, including identifying a location of the MIC (e.g., in location civic report 534-9). Vendor specific data 538 can also include MIC key information 538-1, which can indicate which key was used for generating a MIC.

Packet number field 540-0 can include a packet number value for counter operations, or in some embodiments, can also include vendor specific data 538. MIC field 540-1 can include a MIC generated from the entire measurement frame 506 according to methods and operations as described herein and equivalents.

In this way, a FTM measurement frame compatible with one or more IEEE 802.11 wireless standards (e.g., 11mc, 11n, 11ac, 11ax) can include a MIC for authentication in a frame field reserved for vendor specific data.

Figure 6:
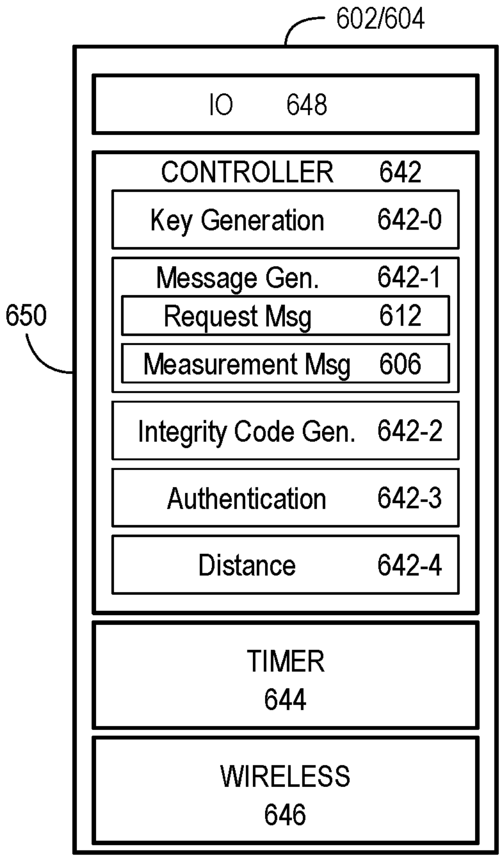
FIG. 6 is a block diagram of a wireless device according to an embodiment.

FIG. 6 is a block diagram of a device 602 (or 604) according to an embodiment. A device 602 can operate as an initiating device, responding device or both, as described herein and equivalents. A device 602 can include controller circuits 642, a timer circuit 644, wireless circuits 646 and input/output (IO) circuits 648. Controller circuits 642 can include processor and/or logic circuits for executing the various wireless measurement related operations described herein. Controller circuits 642 can include but are not limited to: one or more processors with corresponding memory, custom logic, programmable logic, or combinations thereof.

Controller circuits 642 can include key generation circuits 642-0, message generation circuits 642-1, integrity code generation circuits 642-2, authentication circuits 642-3 and distance calculation circuits 642-4. It is understood that such circuits (642-0 to 642-4) can use the same structures (e.g., processor, memory, registers) in executing their various described functions. Key generation circuits 642-0 can derive a mutual key for generating integrity codes as described herein and equivalents. In some embodiments, key generation circuits 642-0 can generate a mutual key in a provisioning or other process, including during a pre-association operation, association operation or other service protocol (e.g., matter commissioning or DPP), as but a few examples.

Message generation circuits 642-1 can generate messages for transmission during distance measurement operations. Such messages can include, but are not limited to, measurement request messages 612 and measurement messages 606. In some embodiments, message generation circuits 642-2 can generate messages in at least two steps. In one step, data (e.g., fields) for a message can be generated. In a subsequent step, an integrity code can be generated from the message data and added to create a final message for transmission.

Integrity code generation circuits 642-2 can execute one or more arithmetic-logic operations on message data values using a mutual key to generate an integrity code. Integrity code generation circuits 642-1 can access storage circuits storing data for out-going messages to generate an integrity code for insertion in such an outgoing message. Integrity code generation circuits 642-1 can also access storage circuits storing received messages to generate an integrity code for authentication of such received messages. Such arithmetic-logic functions can take the form of dedicated circuits, instructions executed by processor(s), or some combination thereof. In some embodiments, this can include a cryptographic hash function. However, any other suitable operation can be used that can generate a value sufficient for the degree of authentication desired.

Authentication circuits 642-3 can authenticate received measurement messages with integrity codes. Authentication circuits 642-3 can identify an integrity code within a received message and compare it to an integrity code generated for the received message by integrity code generation circuits 642-2. In some embodiments, authentication circuits 642-3 can invalidate a receive time for a received message. In some embodiments this can include changing a stored receive time (e.g., register value) from a counter generated value to a predetermined value (e.g., zero).

Distance calculation circuits 642-4 can use time values generated by timer 644 along with time values received from another device to calculate a distance to another device. In some embodiments, such calculations can be based on a RTT to the other device. In some embodiments, such calculations can be based on a message transit time equal to the speed of light. Distance calculations can be based on one round (i.e., transit time to and from the other device), or multiple such rounds.

Timer circuits 644 can generate time values for a device 604/604 to calculate a distance. In some embodiments this can include time values indicating the receipt of a measurement message (e.g., start of turnaround time, t2), and the transmission of a corresponding "answering" measurement message (e.g., end of a turnaround time, t3). In addition or alternatively, timer circuits 644 can generate time values for another device to calculate a distance value. In some embodiments this can include time values indicating the transmission of measurement message to the other device (e.g., TOD, t1) and time values indicating the receipt of an answering message from the other device (e.g., TOA, t4).

Wireless circuits 646 can transmit and receive according to any suitable wireless standard, including public and/or private standards. Input/output (IO) circuits 648 can enable other devices or systems to control operations of device 602 and/or receive data from device 602.

In some embodiments a device 606/612 can be formed with a same integrated circuit substrate 650.

In this way a wireless device can include circuits for authenticating wireless distance measurement message using integrity codes generated by a key shared with another device. Further, a wireless device can embed such integrity codes in outgoing wireless measurement messages for authentication by a receiving device.

Figure 7:
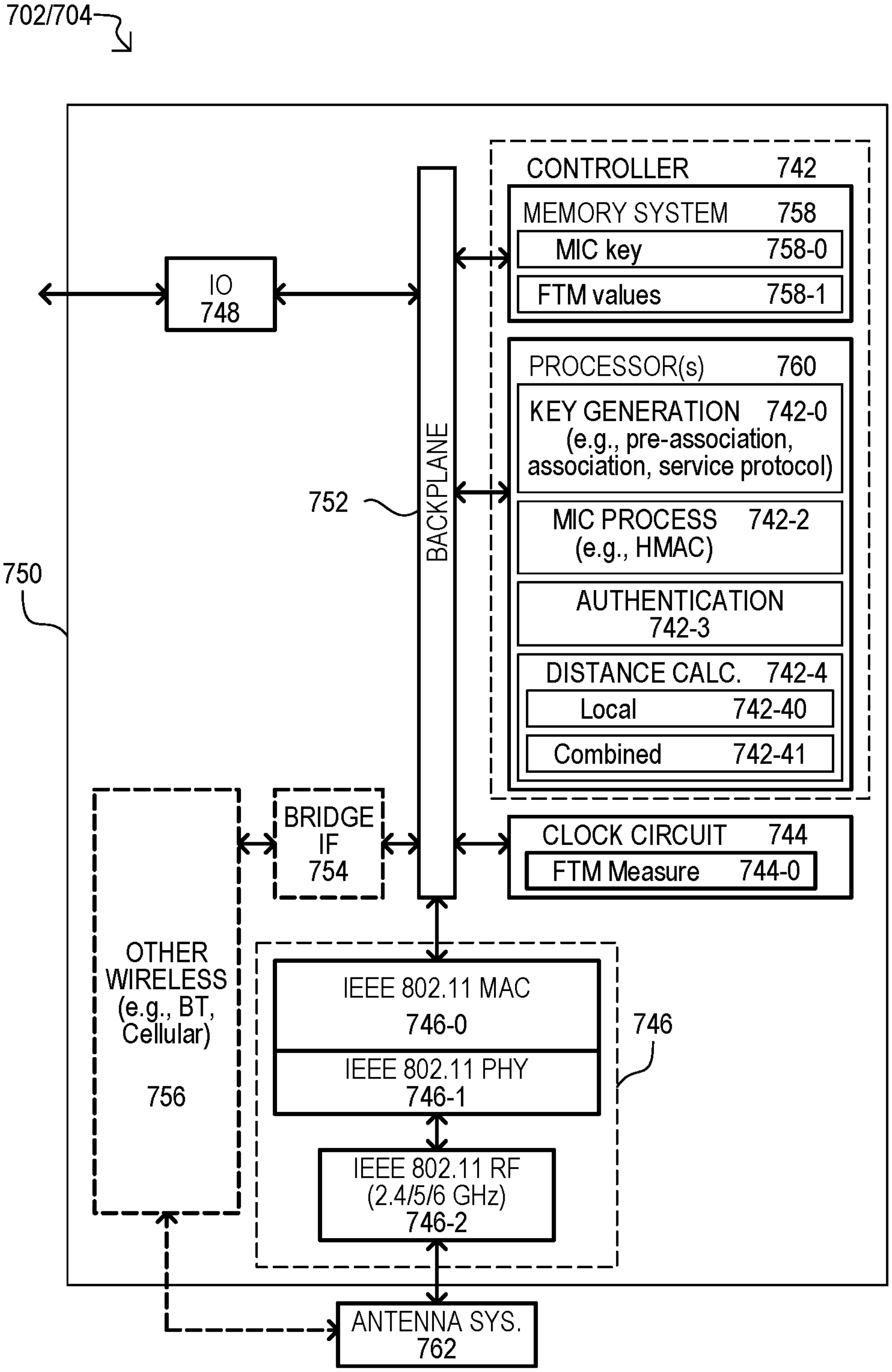
FIG. 7 is a block diagram of a wireless device according to another embodiment.

FIG. 7 is a block schematic diagram of a device 702 (or 704) according to another embodiment. A device 702 can be an initiating STA or a responding STA as described herein and equivalents, or can be included in such a device as a component. A device 702 can include controller circuits 742, clock circuits 744, IEEE 802.11 wireless circuits 746, and IO circuits 748 in communication with one another over a communications network (e.g., backplane) 752. Optionally, a device 702 can include other wireless circuits 756 in communication with controller circuits 742 and other circuits. In the embodiment shown, such communication can be via bridge interface circuits 754.

Controller circuits 742 can include a memory system 758 and processor circuits 760. A memory system 758 can include any suitable memory circuits including nonvolatile and/or volatile memory. A memory system 758 can store various values including but not limited to a MIC key 758-0 and FTM values 758-1. A MIC key 758-0 can be a mutual key derived through one or more processes as described herein and equivalents. FTM values 758-1 can be time measurement values recorded and/or received in messages by device 702. A memory system 758 can also store instructions for execution by processor circuits 760 (e.g., firmware) .

Processor circuits 760 can execute instructions stored in memory system 758 to provide various functions, including but not limited to: key generation 742-0, MIC processing 742-2, authentication 742-3 and distance calculation 742-4. Key generation 742-0 can generate a shared key according to any of the embodiments described herein, or equivalents. However, alternate embodiments anticipate arrangements in which a device 702 can be manufactured with all or part of a value used to generate a MIC key 758-0.

A MIC process 742-2 can generate a MIC for a received measurement message. In some embodiments, such an action can include accessing a message received in a buffer or the like and extracting a MIC from the message. A predetermined arithmetic-logic operation can be executed on the entire message (excluding the MIC) using the MIC key to generate a compare MIC. A MIC process 742-2 can also generate a MIC for an outgoing measurement message. In some embodiments, such an action can include accessing a message stored in a buffer or the like. The predetermined arithmetic-logic operation can be executed on the message data using the MIC key to generate a message MIC. The message MIC can then be added to the outgoing message.

An authentication process 742-3 can compare the MIC in a received message to MIC generated from the message. If such MICs match, a message can be considered authenticated. If such MICs do not match, a message can be considered not authenticated, and a receive time for the message can be invalidated (e.g., set to zero).

A distance calculation process 742-4 can include a local distance calculation 742-40 and a combined distance calculation 742-41. A local distance calculation 742-40 can include generating a distance value from a RTT time as described herein and equivalents (e.g., includes (t4-t1)-(t3-t2)). It is understood that some distance calculations can include multiple rounds of such calculations. A combined distance calculation 742-21 can use a local distance calculation and a distance calculation received from another device to execute a combined distance calculation. As but one of many possible examples, a combined distance calculation can be the average of a local distance calculated by an initiating STA and distance value received from a corresponding responding STA, or vice versa.

A clock circuit 744 can generate time values sufficient for executing a ranging operation. In the embodiment shown, clock circuit 744 can provide FTM measurements 744-0 compatible with one or more IEEE 802.11 wireless standards. Such measurement values can be provided to or accessed by other circuits of device 702. A time indicated by clock circuit 744 can mark the receipt of a measurement messages (e.g., start of a turnaround time t2), the transmission of a measurement message (e.g., end of a turnaround time t3) and any other time values suitable for the wireless distance operations.

Wireless circuits 746 can provide wireless communications compatible with one or more IEEE 802.11 wireless standards. Wireless circuits 746 can include MAC layer circuits 746-0, physical layer (PHY) circuits 746-1 and RF circuits 746-2. Wireless circuits 746 can enable the transmission of communications compatible with one or more IEEE 802.11 standards, on any suitable band, including but not limited to the 2.4 GHz, 5 GHZ and/or 6 GHz band. In some embodiments, wireless circuits 746 can be compatible with any of the IEEE 802.11mc, 11n, 11ac, 11ax standards.

IO circuits 748 can enable control of a device 702 from sources external to the device. IO circuits 748 can enable communication with the device according to any suitable fashion. In some embodiments, IO circuits 748 can include serial communication circuits, including but not limited to: serial digital interface (SDI), universal serial bus (USB), universal asynchronous receiver transmitter (UART), I2C, or I2S. Bridge interface circuits 754 can enable communications with other wireless circuits 756 (e.g., Bluetooth, cellular circuits). Such other wireless circuits can be part of the same device 702 or can be a separate device.

In some embodiments, circuits of a device 702 can be formed with a same integrated circuit substrate 750. A device 702 can operate in conjunction with an antenna system 762 having one or more antennas compatible with one or more IEEE 802.11 wireless standards. In some embodiments, antenna system 762 can also be compatible with other wireless circuits 756.

In this way, a wireless device compatible with IEEE 802.11 wireless standards can authenticate FTM measurement messages received from another device using a shared key to generate a MIC for the received message. A device 702 can also generate MICs for outgoing FTM measurement messages using a shared key.

Figure 8:
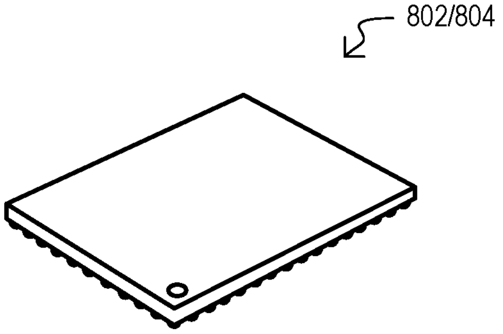
FIG. 8 is a diagram of an integrated circuit device according to an embodiment.

While embodiments can include devices and systems with various interconnected components, embodiments can also include unitary devices which can execute initiator and/or responder device functions as described herein. In some embodiments, such unitary devices can be advantageously compact single integrated circuits (i.e., chips). FIG. 8 shows a packaged single chip device 802/804, which can generate integrity codes for, and execute authentication operations on, messages for a wireless ranging operation. A device according to embodiments can include any other suitable integrated circuit packaging type, as well as direct bonding of a device chip onto a circuit board or substrate.

In this way, a wireless integrated circuit device can enable authentication of wireless measurement messages for secure wireless ranging operations that do not have to include full encryption of such measurement messages.

While embodiments can include any of the methods described herein with reference to the various operations, devices and systems, additional methods will now be described with reference to flow diagrams. It is understood that all, or portions of the described methods can be combined with one another.

Figure 9:
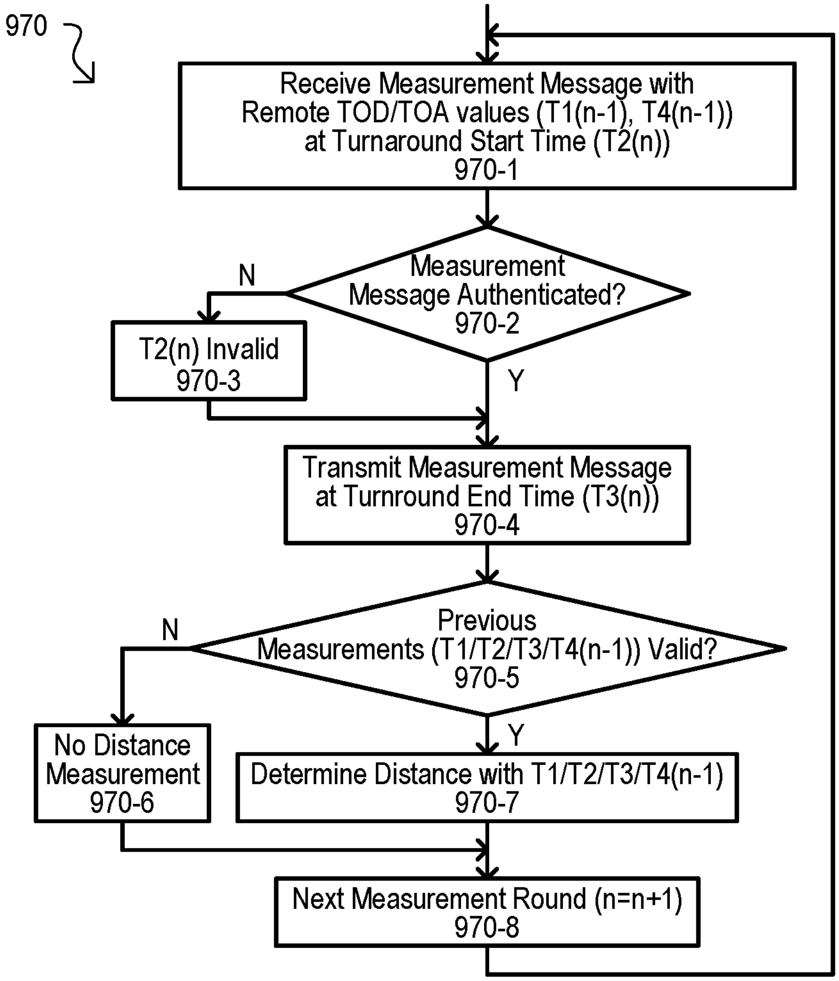
FIG. 9 is a flow diagram of a method of authenticating wireless distance measurement requests according to an embodiment.

FIG. 9 is a flow diagram of a method 970 according to an embodiment. A method 970 can be executed by an initiating device and/or responding device as described herein or equivalents. A method 970 can include receiving a measurement message that includes remote TOA and TOD values at a turnaround start time 970-1. Such an action can include receiving a wireless message, determining such a wireless message is a measurement message and determining the time (e.g., t2, T2) at which such a message is received.

A received measurement message can be authenticated 970-2. Such an action can include any suitable authentication method, and can include any of those described herein, or equivalents that use integrity codes embedded with the measurement message. If a measurement message fails authentication (N from 970-2) the receive time for the message can be invalidated 970-3. Such an action can ensure no distance measurement will be generated using such a value.

A method 970 can include transmitting a measurement message at a turnaround end time 970-4. Such an action can include transmitting a measurement message in response to a received measurement message, and determining the time of the transmission (e.g., t3, T3). In some embodiments, such a message can include previously determined TOD, TOA values to enable another device to execute its own distance measurement operation.

A method 970 can then determine if time measurements for a previous round are valid 970-5. If a time measurement corresponds to a failed authentication message, such a time measurement can be considered invalid. While a time measurement can be indicated as invalid according to any suitable manner, in some embodiments, a time value of zero can indicate the time is invalid. If any time measurements for the round(s) (e.g., t1-t4 or T1-T4) are determined to be invalid (N from 970-5), no distance measurement for the set can be calculated 970-6.

If time measurements are determined to be valid (Y from 970-7), a distance can be calculated using the time values 970-7. Such an action can include any of the distance calculations described herein or equivalents.

In the embodiment shown, once a distance calculation has been made, or not made, for a particular round, a method 970 can be proceed to a next round 970-8. However, as noted herein, alternate embodiments can execute a distance calculation using time values for a burst (i.e., multiple rounds).

In this way, measurement messages can be authenticated, and if they fail authentication, a receive time value for the measurement message can be invalidated. Further, if any time values for a distance calculation are determined to be invalid, such a distance calculation may not be made or may be ignored.

Figure 10:
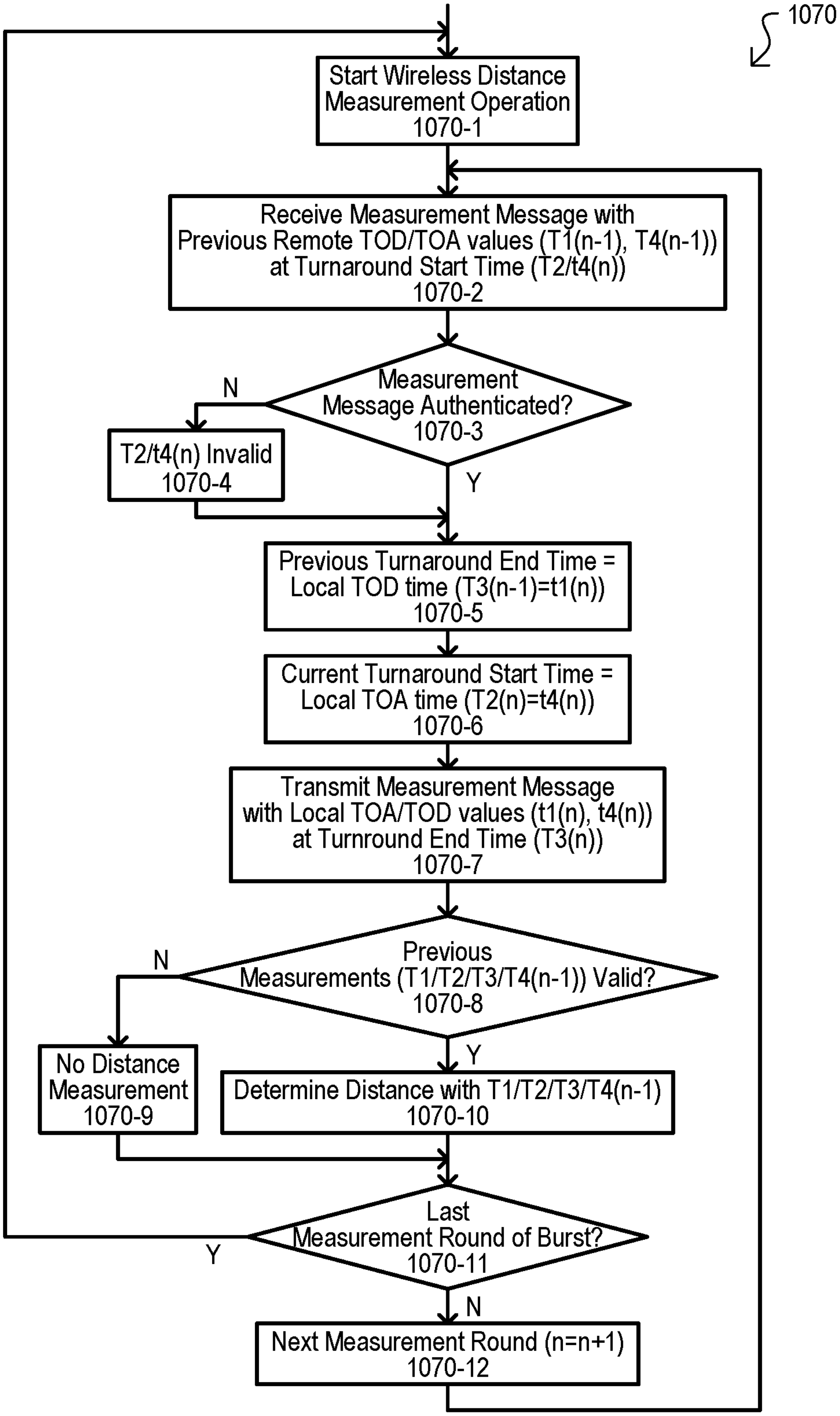
FIG. 10 is a flow diagram of a method for executing bi-directional wireless distance measurement operations with authentication according to an embodiment.

While embodiments can include methods for unidirectional authentication for wireless ranging operations, embodiments can also include bi-directional methods, where both devices in a ranging operation exchange time measurement values and calculate their own distance values. FIG. 10 is a flow diagram of such an embodiment.

FIG. 10 shows a method 1070 for wireless range measurement that can be executed by an initiating or responding device according to embodiments. A method 1070 can include starting a wireless distance measurement operation 1070-1. Such an action can include a device receiving a request from another device (e.g., an initiating device) to begin such operations, or receiving a measurement from another device (e.g., a responding device).

A method 1070 can include receiving a measurement message with previous remote TOD and TOA values at a turnaround start time 1070-2. Such an action can include receiving a measurement message from an initiating device that includes the TOD/TOA values. This is in contrast to unidirectional wireless distance measurement operations in which such values are received by an initiating device from a responding device.

A method 1070 can authenticate and possibly invalidate a receive time for the received message 1070-3/4 in the same or equivalent fashion as described for FIG. 9. Unlike FIG. 9, a previous turnaround end time (i.e., the time at which a previous measurement message was transmitted, T3(n−1)), can serve as a local TOD time (t1(n)) for a next out-going measurement message 1070-5. A current turnaround start time (i.e., the time at which the current measurement message is received, T2(n)) can be considered a local TOA time (t4(n)) for the next out-going message 1070-6. A method 1070 can then transmit an outgoing measurement message that includes the current TOA and TOD values at a turnaround end time 1070-7.

A method 1070 can determine if a set of time values (T1(n−1), T2(n−1), T3(n−1), T4(n−1)) for a previous round are valid 1070-8. Such an action can include any of those described herein, including determining if any of the time values is a particular number (e.g., zero). If any such time values are not valid (N from 1070-8), no distance measurement can be calculated (1070-9). If time values are determined to be valid (Y from 1070-8), a distance measurement can be calculated (1070-10). Such an action can include any of those described herein or equivalents.

A method 1070 can determine if a current round is a last round of a burst 1070-11. If a last round has been reached (Y from 1070-11), a method can return to waiting for a new measurement operation to begin. If a last round has not been reached (N from 1070-11), a method can proceed to a next measurement round 1070-12 and wait to receive a next measurement message (return to 1070-2).

In this way, bi-direction measurement messages can include a device authenticating received measurement messages with TOA and TOD values, transmitting messages with TOA and TOD values, and calculating a distance value with the received TOA and TOD values.

Figure 11:
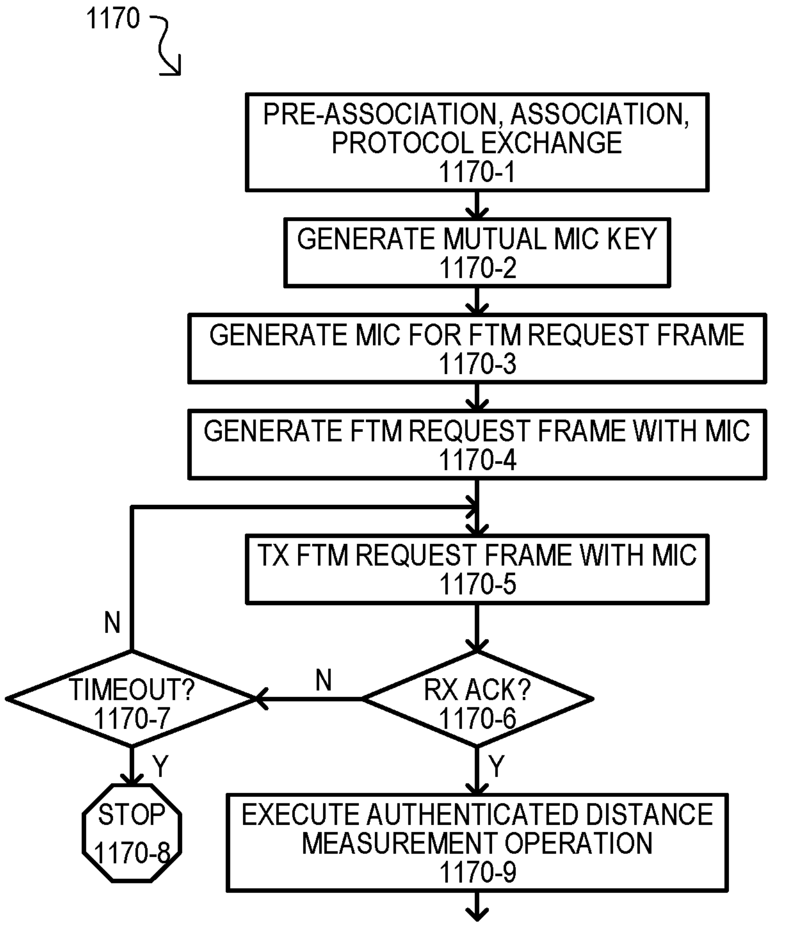
FIG. 11 is a flow diagram of a method for generating a FTM request according to an embodiment.

FIG. 11 is a flow diagram of a method 1170 according to a further embodiment. A method 1170 can be executed by an initiating STA to request a wireless ranging operation that can be compatible with one or more IEEE 802.11 wireless standards. A method 1170-1 can include an initial protocol to establish MIC key values 1170-1. Such an action can include, but is not limited to: a pre-association operation, association operation or other protocol, such as matter commissioning or DPP. In response to action 1170-1, a mutual key can be generated 1170-2. A mutual key is understood to be a key that can be separately derived by another device involved in a ranging operation (e.g., a responding STA).

A method 1170 can include generating a MIC for a FTM request frame 1170-3. Such an action can include determining data (e.g., field values) for a FTM request frame, then executing an arithmetic-logic operation with the MIC key value (e.g., cryptographic hash function) to generate a MIC for the FTM request frame. A FTM request frame can then be generated that includes the corresponding MIC 1170-4. Such an action can include adding the MIC to a predetermined location within the request frame. Such an action can include any of those described herein or equivalents, including placing the MIC in a field designated for vendor-specific information.

The FTM request frame with the MIC can be transmitted 1170-5. Such an action can include transmitting a frame according to an IEEE 802.11 wireless standard, including but not limited to IEEE 802.11mc, 11n, 11ac or 11ax. If an ACK is not received (N from 1170-6) within a time period (N from 1170-7), the FTM request frame can be re-transmitted. If no ACK is received after a predetermined time period (Y from 1170-7) a method can stop 1170-8. If an ACK is received (Y from 1170-6), an authenticated distance measurement operation can be executed 1170-9. Such an action can include authenticated measurement operations according to any of the embodiments described herein or equivalents.

In this way, an initiating STA can transmit a FTM request frame with a MIC to enable a responding STA to authenticate the measurement request frame.

Figure 12:
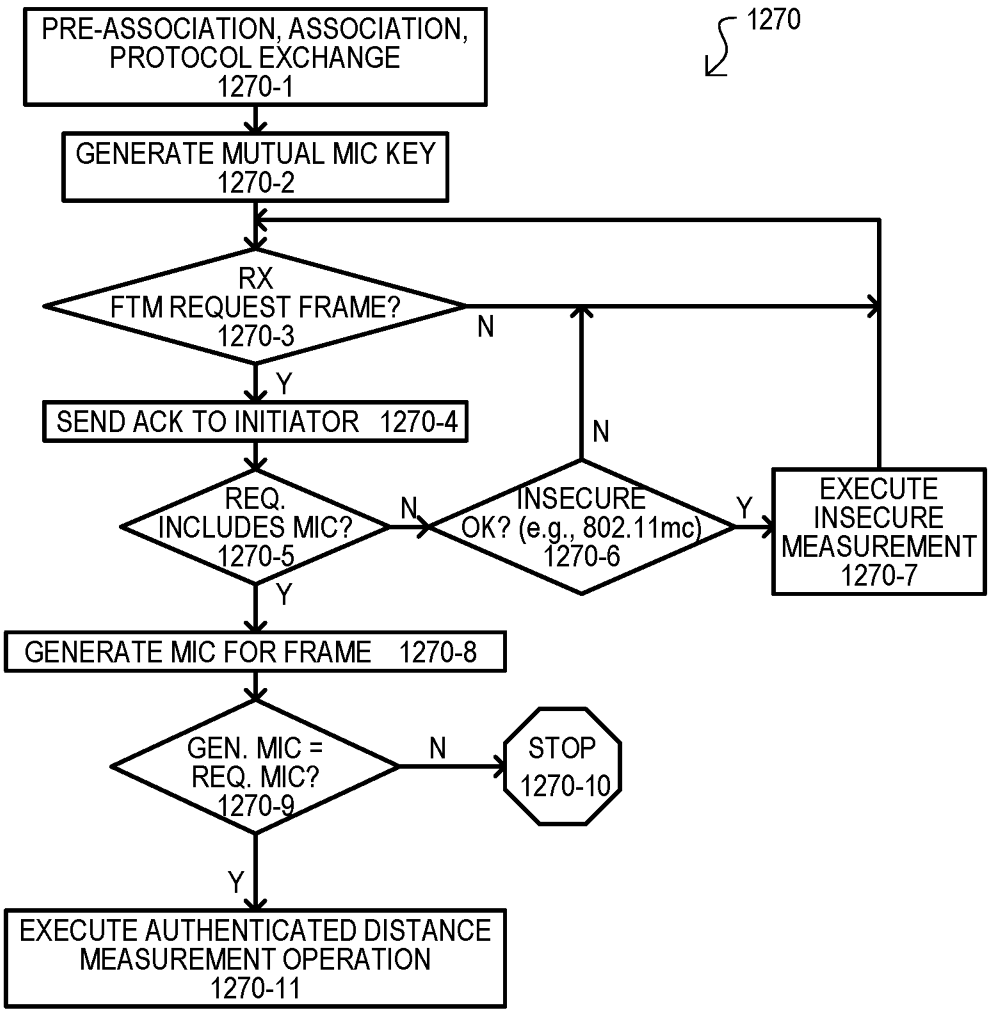
FIG. 12 is a flow diagram of a method for processing a FTM request with authentication according to an embodiment.

FIG. 12 is a flow diagram of a method 1270 according to a further embodiment. A method 1270 can be executed by a responding STA to execute a wireless ranging operation from an initiating STA that can be compatible with one or more IEEE 802.11 wireless standards. A method 1270 can include an initial protocol to establish MIC key values 1270-1 as well as generating a MIC 1270-2. Such actions can include any of those described for boxes 1170-1/2 of FIG. 11.

A method 1270 can include determining if a FTM request frame has been received 1270-3. If a FTM request frame is received (Y from 1270-3), an ACK can be transmitted to a sending initiating STA 1270-4. A determination can be made as to whether or not a received FTM request includes a MIC 1270-5. Such an action can include examining the values in one or more fields of the FTM request. If a MIC is not included (N from 1270-5), a method can determine if insecure operations have been enabled 1270-6. If insecure operations are not enabled (N from 1270-6), a method can continue to wait for another FTM request frame. If insecure operations have been enabled (Y from 1270-6), insecure measurement operations can proceed 1270-7. In some embodiments, this can include insecure measurements according to the IEEE 802.11 mc standard.

If a FTM request frame is determined to include a MIC (Y from 1270-5), a MIC can be generated for the FTM request frame 1270-8. A generated MIC can be compared to that of the FTM request 1270-9. If the MICs do not match (N from 1270-9), the FTM request can be considered not authenticated, and a method can stop 1270-10. If the MICs match (Y from 1270-9), the FTM request can be considered to be authenticated, and a method can begin an authenticated measurement operation 1270-11. Such an action can include authenticated measurement operations according to any of the embodiments described herein or equivalents.

In this way, a responding STA can receive and authenticate a FTM request frame with a MIC, before entering into a wireless distance measurement operation with an initiating STA.

Figure 13:
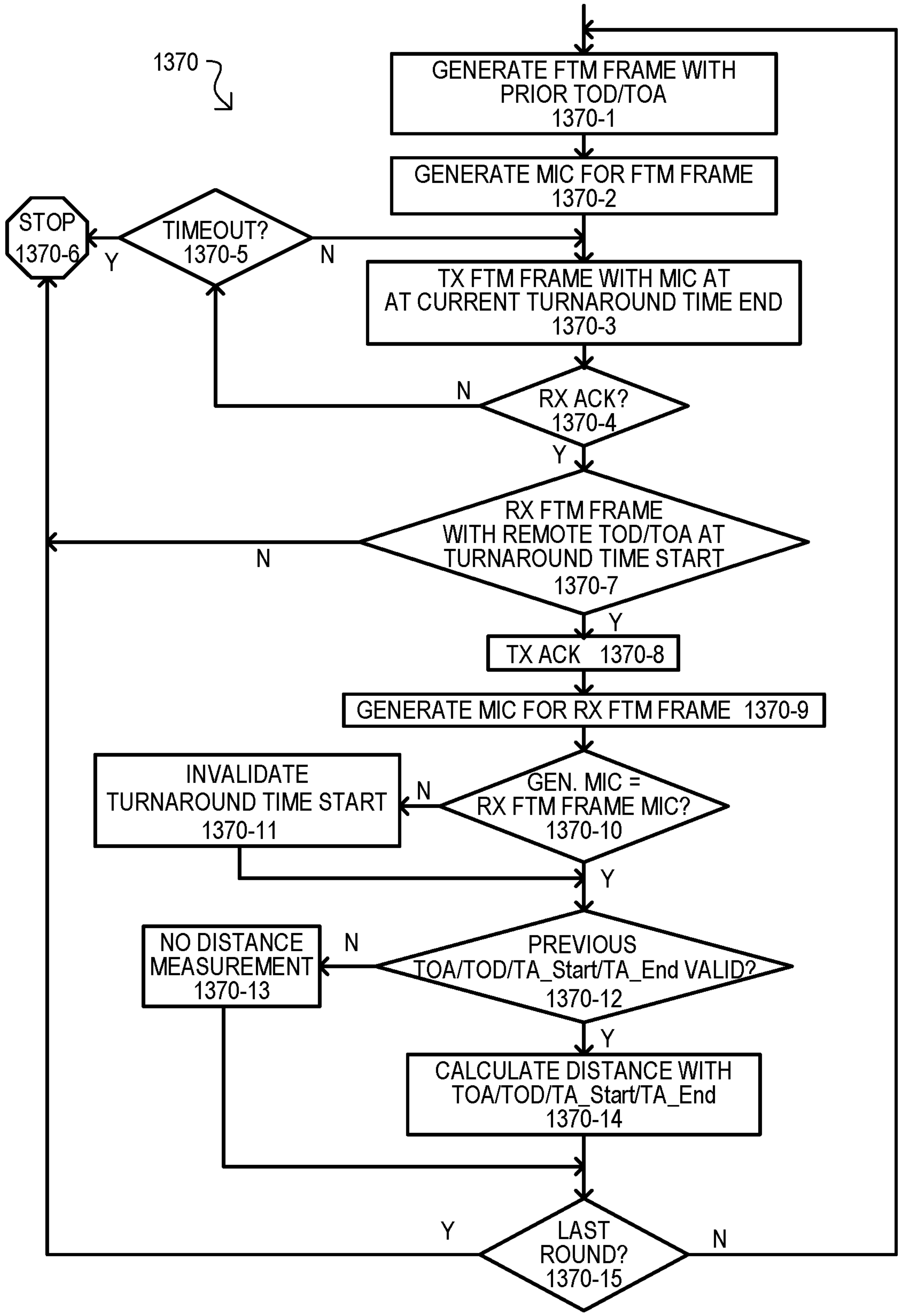
FIG. 13 is a flow diagram of a method for bi-directional FTM measurement operations according to an embodiment.
Figure 14:
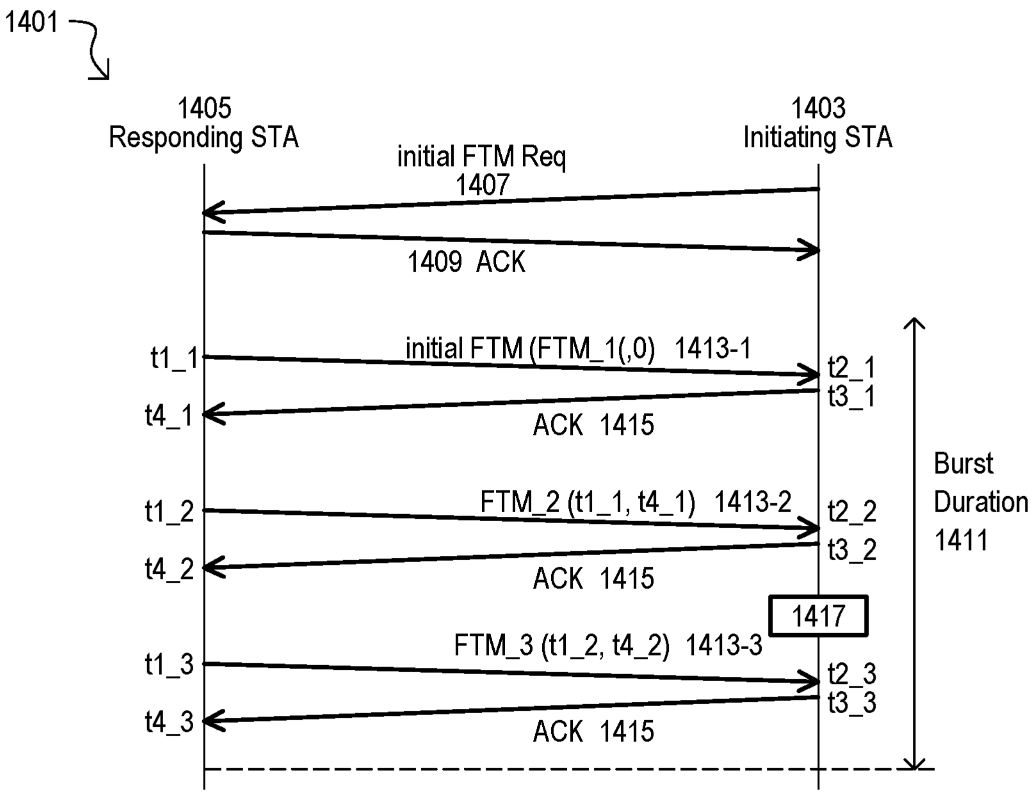
FIG. 14 is a diagram showing conventional FTM measurement operations.

FIG. 13 is a flow diagram of a FTM method 1370 according to another embodiment. A method 1370 can be executed by an initiating STA and/or a responding STA. A method 1370 can include generating an FTM frame with prior TOD and TOA values 1370-1 (if such values are available). Such an action can include accessing a previously store TOD value (e.g., time at which a previous FTM frame was transmitted, and a previously stored TOA value (e.g., time at which a previous FTM frame was received). A MIC can be generated for the FTM frame 1370-2 and the FTM frame with the MIC can be transmitted 1370-3. The time at which the FTM frame is transmitted can the end of a local turnaround time (TA_Start), as well as a next TOD time for transmission.

If an ACK is not received for the FTM frame (N from 1370-4) and a timeout period has not expired (N from 1370-5), the FTM frame can be retransmitted. If the timeout period expires (Y from 1370-5), the measurement operation can end 1370-6. If an ACK is received (Y from 1370-4), a method 1370 can wait to receive a FTM frame. If a FTM frame not received (N from 1370-7), the measurement operation can end 1370-6.

If a FTM frame is received (Y from 1370-7), an ACK can be returned 1370-8. A MIC can be generated for the received FTM frame 1370-9. Such an action can include executing a predetermined MIC algorithm with a mutual key on fields of the FTM message. A generated MIC can be compared to a MIC located within the FTM frame 1370-10. If the MICs do not match (N from 1370-10), the turnaround start time for the message can be invalidated 1370-11.

If any of a previous set of time measurements are determined to be invalid (N from 1370-12), a distance measurement is not taken 1370-13. If previous time measurements are determined to be valid (Y from 1370-12), a distance can be calculated 1370-14. If a last round has not been reached (N from 1370-15), a method 1370 can return to generating and receiving FTM frames. If a last round has been reached (Y from 1370-15), a method 1370 can end 1370-6.

In this way, a device compatible with one or more IEEE 802.11 wireless standard can provide authenticated, bi-directional FTM measurement operations by the inclusion of MICs in FTM frames.

Embodiments can advantageously provide secure wireless distance measuring operations to wireless systems, including legacy wireless systems that lack the ability to encrypt frames, such as with PMF. In some embodiments, such secure wireless location (e.g., distance measuring) features can be compatible with any of a number of existing standards, including but not limited to IEEE 802.11 mc, 11n, 11ac and 11ax.

Embodiments can include methods, devices and systems that can, by operation of a first wireless device, transmit a measurement request message that includes a request integrity code (IC). The request IC can be generated by executing an arithmetic-logic operation on at least a portion of the measurement request message with a key. A first measurement message can be received at a time t2, where the first measurement message including a first IC. A validation operation can be executed on the first measurement message that includes executing the arithmetic-logic operation on at least a portion of the first measurement message with the key. In response to the first measurement message being determined invalid, t2 can be indicated as invalid. A second measurement message can be transmitted at a time t3 that includes a second IC. The second IC can be generated by executing the arithmetic-logic operation on at least a portion of the second measurement message with the key. A third measurement message can be received that includes two or more remote time values t1 and t4. In response to times t1 to t4 being determined to be valid, first distance value can be calculated with the times t1 to t4.

Embodiments can include methods, devices and systems having controller circuits and timer circuits configured to generate local time values. Controller circuits can be configured to generate a key, generate measurement request messages that include a corresponding integrity code (IC) and indicate a request to begin time measurement operations with another wireless device. Controller circuits can generate measurement messages that each include a corresponding IC and at least two local time values and can generate the ICs by executing arithmetic-logic operations in at least a portion of the corresponding measurement request or measurement message with the key. Controller circuits can further execute a validation operation on received measurement messages by executing the arithmetic-logic operation on at least a portion of each received measurement message with the key, the received measurement messages including remote time values. Controller circuits can determine a local distance value with local and remote time values. Wireless circuits can be included that are compatible with at least one wireless communication protocol and configured to transmit the measurement request messages and measurement messages, and receive measurement messages.

Embodiments can include methods, devices and systems having a first wireless device configured to generate first device time values, generate a key, transmit a measurement request message. A measurement request message can include a corresponding integrity code (IC) and indicates a request for time measurement values from another wireless device. A first wireless device can also transmit measurement messages that each include a corresponding IC and at least two first device time values, generate the ICs by executing arithmetic-logic operations on at least a portion of the corresponding measurement request or measurement message with the key, execute a validation operation on received measurement messages by executing the arithmetic-logic operation on at least a portion of each received measurement message with the key, and determine a first distance value with first device time values and second device time values received from measurement messages. A first antenna system can be configured to wirelessly transmit measurement request messages and measurement messages and wirelessly receive incoming measurement messages.

Methods devices and systems according to embodiments can include measurement messages comprising FTM frames compatible with at least one IEEE 802.11 wireless standard.

Methods devices and systems according to embodiments can include integrity codes that are included in a location civic report field of their respective FTM frames.

Methods devices and systems according to embodiments can include indicating a time (e.g., t2) as invalid by changing the time from a measured time value to a predetermined value (e.g., zero).

Methods devices and systems according to embodiments can include, by operation of a first wireless device, prior to transmitting a request message, communicating with a second wireless device to acquire at least key generation data, and generating the key with the key generation data.

Methods devices and systems according to embodiments can include, by operation of a second wireless device, receiving a measurement request message, and validating the measurement request message by executing the arithmetic-logic operation on at least a portion of the measurement request message with the key. In response to the measurement request message being determined invalid, authenticated measurement operations with the first wireless device can be ended.

Methods devices and systems according to embodiments can include by operation of a second wireless device, in response to the measurement request message being determined as valid, transmitting the first measurement message, receiving the second measurement message at time t4, and executing a validation operation on the second measurement message by executing the arithmetic-logic operation on at least a portion of the second measurement message with the key. In response to the second measurement message being determined invalid, t4 can be indicated as invalid. A measurement message can be transmitted at a time t5. A fourth measurement message can be received at a time t8. The fourth measurement message can including remote values for times t6 and t7. In response to times t3 to t6 being determined to be valid, a second distance value can be calculated with times t3 to t6.

Methods devices and systems according to embodiments can include calculating a mutual distance value with a first distance value generated by a first wireless device and a second distance value generated by a second wireless device.

Methods devices and systems according to embodiments can include timer circuits, controller circuits and wireless circuits formed with a same integrated circuit substrate.

Methods devices and systems according to embodiments can include a controller circuits configured to determine a local time value corresponding to each received measurement message, and, if a received measurement message is determined to be invalid, change the local time value to a predetermined value.

Methods devices and systems according to embodiments can include a second wireless device configured to generate second device time values, generate the key, receive the measurement request message, transmit measurement messages that each include a corresponding IC and at least two second device time values, execute a validation operation on received measurement messages by executing the arithmetic-logic operation on at least a portion of each received measurement value message with the key, and determine a second distance value with received first device time values and second device time values. A second antenna system can be configured to wirelessly transmit and receive measurement value messages.

Methods devices and systems according to embodiments can include a second wireless device configured to execute a validation operation on the received measurement request messages by executing the arithmetic-logic operation on at least a portion of the measurement request message with the key, and in response to the measurement request message being determined to be invalid, ending authenticated measurement operations with a first wireless device.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

by operation of a first wireless device, transmitting a measurement request message that includes a request integrity code (IC), the request IC generated by executing an arithmetic-logic operation on at least a portion of the measurement request message with a key, storing in memory circuits a time at which a first measurement message is received at the first wireless device as a time t2, the first measurement message including a first IC, executing a validation operation on the first measurement message that includes executing the arithmetic-logic operation on at least a portion of the first measurement message with the key, in response to the first measurement message being determined invalid, setting time t2 to an invalid value in the memory circuits, after receiving the first measurement message, transmitting a second measurement message to a second wireless device at a time t3 that includes a second IC, the second IC generated by executing the arithmetic-logic operation on at least a portion of the second measurement message with the key, receiving a third measurement message from the second wireless device that includes at least two remote time values t1 and t4, t1 corresponding to a time of departure for the first measurement message from the second wireless device and t4 corresponding to a time of arrival for the second measurement message at the second wireless device, and in response to none of times t1, t2, t3 or t4 being having invalid values, calculating a first distance value between the first and second wireless devices with the times t1, t2, t3 and t4; wherein at least the first and third measurement messages are transmitted according to a wireless standard that does not encrypt the entire message.

2. The method of claim 1, wherein the first, second and third measurement messages comprise fine time measurement (FTM) frames compatible with at least one IEEE 802.11 wireless standard.

3. The method of claim 2, wherein the first and second ICs are included in a location civic report field of their respective FTM frames.

4. The method of claim 1, further including:

by operation of the first wireless device, prior to transmitting the measurement request message, communicating with the second wireless device to acquire at least key generation data, and generating the key with the key generation data.

5. The method of claim 1, further including:

by operation of the second wireless device, receive the measurement request message, and validate the measurement request message by executing the arithmetic-logic operation on at least a portion of the measurement request message with the key, in response to the measurement request message being determined invalid, ending authenticated measurement operations with the first wireless device.

6. The method of claim 5, further including:

by operation of the second wireless device, in response to the measurement request message being determined as valid, transmitting the first measurement message, receiving the second measurement message at time t4, executing a validation operation on the second measurement message by executing the arithmetic-logic operation on at least a portion of the second measurement message with the key, in response to the second measurement message being determined invalid, setting time t4 to an invalid value, transmitting the third measurement message at a time t5, receiving a fourth measurement message at a time t8, the fourth measurement message including remote values for times t6 and t7, t6 corresponding to a time of arrival for the third measurement message at the first wireless device and t7 corresponding to a time of departure for the fourth measurement message from the second wireless device, and in response to none of times t3, t4, t5, or t6 being having invalid values, calculate a second distance value between the first and second wireless devices with times t3, t4, t5 and t6.

7. The method of claim 6, further including calculating a mutual distance value with the first and second distance values.

8. A wireless device, comprising:

timer circuits configured to generate local time values;

controller circuits configured to generate a key, generate a measurement request message that includes a corresponding integrity code (IC) and indicates a request to begin time measurement operations with another wireless device, generate a second measurement message for transmission to the other wireless device at a local time value t3 that includes a corresponding IC generate a fourth measurement message that includes a corresponding IC and at least the local time value t3 and a local time value t6 corresponding to a time of arrival of a previous third measurement message, generate the ICs by executing arithmetic-logic operations on at least a portion of the corresponding measurement request or measurement message with the key, execute a validation operation on received first and third measurement messages by executing the arithmetic-logic operation on at least a portion of each received measurement message with the key, the received third measurement message including remote time value t1 corresponding to a time of departure for the received first measurement message and a remote time value t4 corresponding to a time of arrival for the third measurement message, and determine a local distance value corresponding to a distance between the wireless device and the other wireless device with local time values t2 and t3 and remote time values t1 and t4, where t2 corresponds to a time of arrival for the first measurement message; and wireless circuits, compatible with at least one wireless communication protocol, configured to transmit the measurement request message and the second and fourth measurement messages, and receive the first and third measurement messages; wherein at least the first and third measurement messages are transmitted according to a wireless standard that does not encrypt the entire message.

9. The device of claim 8, wherein:

the wireless circuits are compatible with at least one IEEE 802.11 wireless standard; and the first, second, third and fourth measurement messages comprise fine time measurement (FTM) frames compatible with the at least one IEEE 802.11 wireless standard.

10. The device of claim 8, wherein the controller circuits comprise at least one processor circuit and instructions for at least generating the key and executing the validation operation on received measurement value messages.

11. The device of claim 8, wherein the timer circuits, controller circuits and wireless circuits are formed with a same integrated circuit substrate.

12. The device of claim 8, wherein the controller circuits are further configured to, if the either of the first or third received measurement messages is determined to be invalid, change the corresponding local time value t2 or t3 to a predetermined value.

13. A system, comprising:

a first wireless device configured to generate first device time values, generate a key, transmit a measurement request message that includes a corresponding integrity code (IC) and indicates a request for time measurement values from another wireless device, transmit a second measurement message for transmission to the other wireless device at a device time value t3, transmit a fourth measurement messages that includes a corresponding IC and the device time value t3 and a device time value t6 corresponding to a time of arrival of a previous third measurement message, generate the ICs by executing arithmetic-logic operations on at least a portion of the corresponding measurement request or measurement message with the key, execute a validation operation on received first and third measurement messages by executing the arithmetic-logic operation on at least a portion of each received measurement message with the key, the received third measurement message including second device time value t1 corresponding to a time of departure for the received first measurement message and second device time value t4 corresponding to a time of arrival for the third measurement message, and determine a first distance value with first device time values t2 and t3 and second device time values t1 and t4, where t2 corresponds to a time of arrival for the first measurement message, the first distance value corresponding to a distance between the first wireless device and the other wireless device; and a first antenna system configured to wirelessly transmit measurement request messages and measurement messages and wirelessly receive incoming measurement messages; wherein at least the first and third measurement messages are transmitted according to a wireless standard that does not encrypt the entire message.

14. The system of claim 13, wherein the first, second, third and fourth measurement messages comprise fine time measurement (FTM) frames compatible with at least one IEEE 802.11 wireless standard.

15. The method of claim 14, wherein the ICs are included in a location civic report field of their respective FTM frames.

16. The system of claim 13, wherein:

the first wireless device is further configured to prior to transmitting the measurement request message, establish initial communications with the other wireless device to acquire at least key generation data, and generate the key with the key generation data.

17. The system of claim 13, wherein:

the first wireless device is further configured to transmit an acknowledgement in response to receiving a measurement message from the other wireless device; and the other wireless device is further configured to transmit an acknowledgement in response to receiving a measurement message from the first wireless device.

18. The system of claim 13, further including:

the other wireless device configured to generate second device time values, generate the key, receive the measurement request message, transmit the first and third measurement messages, execute a validation operation on received second and fourth measurement messages by executing the arithmetic-logic operation on at least a portion of each received measurement message with the key, and determine a second distance value with received first device time values t3 and t6 and second device time values t4 and t5, where t5 corresponds to a time of departure for the third measurement message; and a second antenna system configured to wirelessly transmit and receive measurement value messages.

19. The system of claim 13, further including:

the other wireless device configured to execute a validation operation on the received measurement request messages by executing the arithmetic-logic operation on at least a portion of the measurement request message with the key, and in response to the measurement request message being determined to be invalid, ending authenticated measurement operations with the first wireless device.

* * * * *